Oct. 1, 1968  R. REKEWITZ  3,403,572
PRECISION GEAR MECHANISM FOR DRIVE
SHAFTS WHICH CROSS ONE ANOTHER
Filed March 21, 1967  2 Sheets-Sheet 1

United States Patent Office 3,403,572
Patented Oct. 1, 1968

3,403,572
PRECISION GEAR MECHANISM FOR DRIVE SHAFTS WHICH CROSS ONE ANOTHER
Rudolf Rekewitz, Munich, Germany, assignor to Siemens Aktiengesellschaft, Munich, Germany
Filed Mar. 21, 1967, Ser. No. 624,760
Claims priority, application Germany, Mar. 28, 1966,
S 102,816
12 Claims. (Cl. 74—426)

ABSTRACT OF THE DISCLOSURE

A gear mechanism for driving the carriage of a Teletype machine. A first shaft, which drives the carriage, has a spur gear which is driven by a worm gear having one screw thread minus a predetermined gap. A stop mechanism disengages the worm gear each rotation thereof so that the teeth of the spur gear are in the gap, thus permitting the spur gear to be rotated independently of the worm gear to return the carriage to the starting position.

Cross-reference to related applications

Applicant claims priority from corresponding German application Ser. No. S 102,816, filed on Mar. 28, 1966.

Background of the invention

In the prior known office and Teletype machines it is customary to take the forward-indexing movements, which proceed according to a certain time-path-law, from curved discs. The forces which appear due to the acceleration of masses must be received by springs, friction brakes or other counter forces which, though they guarantee the progress of the movement, additionally burden the drive mechanism.

For example, in Teletype machines, for step by step feeding in the linkage between the type carriage and the record carrier, in each cycle it is desirable to release the driven member from the driving member in a rest position while the type carriage is returned to start another cycle. The presently known mechanical linkages which satisfy these conditions have, in addition to a high construction cost, the disadvantage of not being able to utilize to the optimum the available time. This is so because the known linkages must first execute a return stroke before again reaching their initial position.

Accordingly, it is an object of the invention to provide an improved gear mechanism for the step by step feeding, for example, of the carriage of a Teletype machine.

Summary

The invention relates to a gear mechanism for intermittently transmitting motion from one shaft to another. A worm gear is mounted on a driving shaft, the gear having one screw thread minus a predetermined portion to form a gap. The driven gear meshes with the worm gear and is driven thereby except when the teeth in said driven gear are in the gap. A stop device is provided for intermittently disconnecting the driving means of the worm gear when the teeth of the driven gear are in the gap so that the driven gear may then be rotated independently of the worm gear.

In the preferred embodiment of the invention the driving shaft, on which is mounted the worm gear, is connected to a friction coupling which further includes the means whereby the driving shaft is stopped with the driven gear in the disengaged or free position.

Drawings

Other objects, advantages and aspects of the invention will become apparent by reference to the following detailed description of the invention and drawings of a specific embodiment thereof wherein.

Detailed description of the invention

Figure 1:
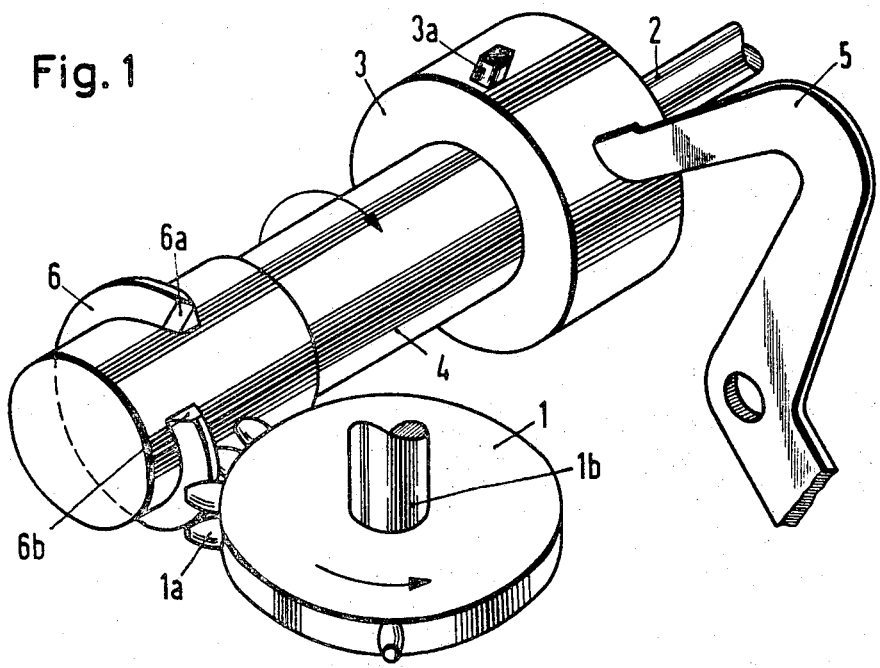
FIG. 1 is a schematic perspective view embodying the principles of the invention and showing the gear mechanism for intermittently transmitting motion from a driving shaft to a driven shaft.

In FIG. 1 there is shown a drive mechanism which can be used, for example, in the step by step advancement of the carriage of a Teletype machine. The following description will refer to the use of the instant invention in combination with a Teletype machine, but it is to be understood that this is by way of example and not by way of limitation.

The mechanism includes a gear 1 mounted on a shaft 1b which is connected by means, not shown, to the carriage of a Teletype machine. The gear 1 also includes a plurality of gear teeth 1a which, as shown in FIG. 1, consist of round pins or pegs. The engaging portions of the pins 1a are adapted to the involute which is formed by a screw thread 6 mounted on a drive shaft 4. The screw thread 6 acts as a worm gear and has a trapezoidal profile. The shaft 4 is fixedly connected to a coupler 3; and the coupler has a friction coupling with a drive shaft 2 which is continuously driven by an electric motor (not shown). The shaft 2 is effective to drive the shaft 4 through the friction coupling of the coupler 3 so long as a stop member 3a is not in engagement with a detention and release lever 5. When the stop member 3a is in engagement with the lever 5, the shaft 2 continues to rotate, but the shaft 4 receives no movement therefrom.

The essential feature of the driving mechanism is that in the STOP position, which is determined by the location of the stop member 3a with respect to the lever 5, the gear 1, is in each case, free from any engagement with the worm gear 6. Thus, it is insured that the gear 1 and the carriage of the typewriter (not shown) which is drivable via the shaft 1b, are completely disconnected from the drive mechanism. This disengaged relationship is accomplished by dimensioning the gap, measured vertically along the axis of the gear 1, between the beginning 6a of the worm gear and the end 6b of the worm gear so that it is slightly larger than the axial height of the teeth 1a. Thus, it is possible to effect the return of the Teletype carriage at the end of a line by turning the gear 1, since the gear 1 is positioned in the gap between 6a and 6b and is thereby disengaged from the drive mechanism.

Figure 2:
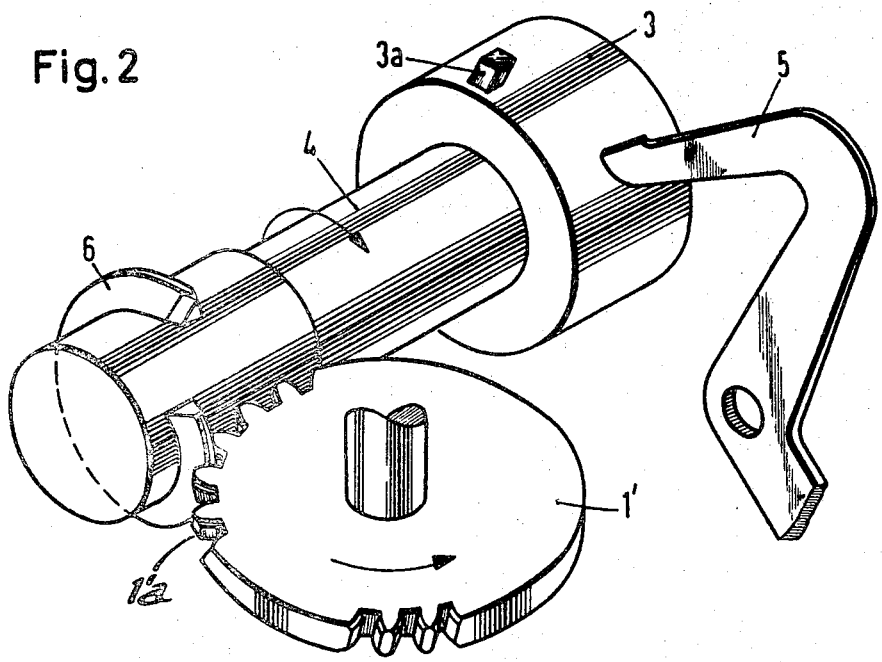
FIG. 2 is a schematic perspective view of another embodiment of the invention.
Figure 3:
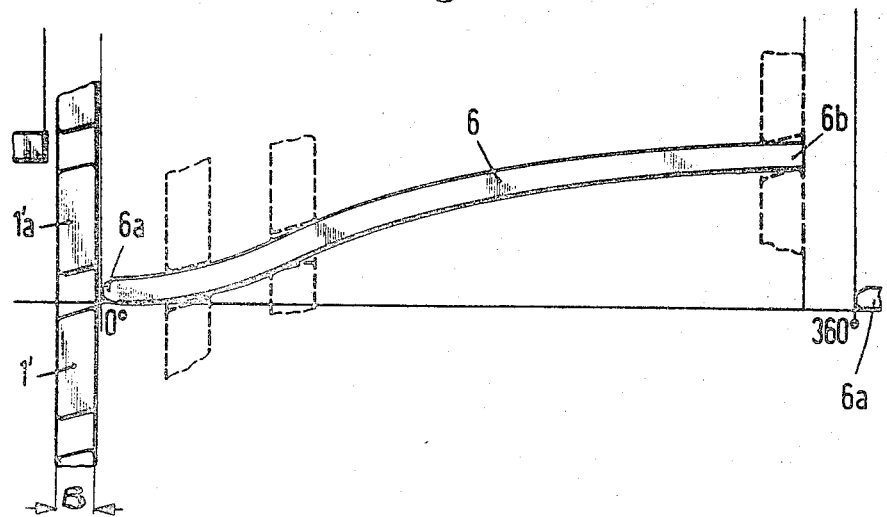
FIG. 3 is a schematic view of the driving worm gear laid out in a horizontal plane and showing the relationship and position of the driven gear teeth with respect thereto over one complete cycle of operation between 0° and 360°.

The drive mechanism shown in the embodiment of FIG. 2 differs from that shown in FIG. 1 only by reason of the design of the teeth of the gear 1', i.e., the teeth are involute shaped. The worm gear 6 of the driving shaft 4 has been laid out in a horizontal plane in FIG. 3 to show the relationship of the worm gear 6 with respect to the teeth of gear 1' during one cycle of operation from 0° to 360°. As shown in FIG. 3 the slope of the worm gear with respect to the axis of the shaft 1b varies from zero at its starting point 6a and then increases to a maximum and then decreases to a slope of zero again at the end of the worm gear 6b. In this manner the motion of the gear 1' is braked to a speed of zero; and only then is the gear 1' released by the worm gear 6.

In order to insure that the forward end 6a of the worm gear 6 enters into a tooth gap, the worm gear is pointed as indicated at 6a. The teeth on the gear 1' have (as best shown in FIG. 3) teeth which are slanted. The angle of the slant corresponds to the average slope of the worm gear 6'. In the starting and finishing positions of the worm gear 6 there is preferably little space between the worm gear 6 and the teeth 1'a (FIG. 3), in order to suppress vibrations. The teeth of the gear 1' are preferably rounded on their front sides which helps to guarantee that the teeth will be properly engaged by the worm gear 6. This also decreases the wear on the teeth at their edges. The breadth or height of the gear 1' is designated B in FIG. 3. If necessary, a multi-thread driving gear can be utilized.

It is to be understood that the invention is not limited to the particular embodiments and features described and shown, but that it comprises any modifications and equivalents within the scope of the appended claims.

I claim:

1. A gear mechanism for intermittently transmitting motion from a driving shaft to a driven shaft which comprises:
   a worm gear (6) mounted on the driving shaft (4), said gear having a screw thread minus a predetermined portion to provide a gap;
   a second gear (1) mounted on the driven shaft (1b) in mesh with the worm gear and drivable thereby, the teeth of said second gear having a height (B) which is less than said gap;
   means (2, 3) for rotating said driving shaft and the worm gear (6) to drive the gear (1); and
   means (3a, 5) for intermittently disconnecting said rotating means when the teeth on said gear (1) are positioned in said gap so that said gear (1) may be rotated independently of said worm gear.

2. A gear mechanism as recited in claim 1 wherein, said rotating means includes:
   a continuously rotating drive shaft (2), and
   a friction coupler (3) connecting said shaft (2) and said driving shaft (4); and wherein said disconnecting means includes:
   a stop member (3a) mounted for rotation with the driving shaft (4); and
   a detention and release mechanism (5) for intermittently engaging said stop member (3a) to stop the shaft (4) when the teeth of the driven gear (1) are in the gap of the worm gear (6).

3. A gear mechanism as recited in claim 2 wherein the trailing end (6b) of said worm gear (6) has a slope of zero with respect to the axis of the driven gear (1).

4. A gear mechanism as recited in claim 3 wherein said worm gear (6) has a pointed leading portion (6a) for entering into engagement with the teeth of said driven gear (1).

5. A gear mechanism as recited in claim 4 wherein the teeth of said driven gear (1) are slanted by an angle which equals the average slope of the worm gear (6) with respect to the axis of the driven gear (1).

6. A gear mechanism as recited in claim 5 wherein the leading end (6a) of said worm gear (6) has a slope of zero with respect to the axis of the driven gear (1).

7. A gear mechanism as recited in claim 6 wherein said driven gear (1) has involute teeth.

8. A gear mechanism as recited in claim 1 wherein said worm gear (6) has a pointed leading portion (6a) for entering into engagement with the teeth of said driven gear (1).

9. A gear mechanism as recited in claim 1 wherein the trailing end (6b) of said worm gear (6) has a slope of zero with respect to the axis of the driven gear (1).

10. A gear mechanism as recited in claim 1 wherein the leading end (6a) of said worm gear (6) has a slope of zero with respect to the axis of the driven gear (1).

11. A gear mechanism as recited in claim 1 wherein the teeth of said driven gear (1) are slanted by an angle which equals the average slope of the worm gear (6) with respect to the axis of the driven gear (1).

12. A gear mechanism as recited in claim 1 wherein said driven gear (1) has involute teeth.

References Cited
UNITED STATES PATENTS

| | | | |
|---|---|---|---|
| 379,479 | 3/1888 | Koch | 74—426 |
| 1,559,970 | 11/1925 | Meahl | 74—426 |

FRED C. MATTERN, JR., *Primary Examiner.*

LEONARD H. GERIN, *Assistant Examiner.*